US012807810B2

(12) United States Patent
Song et al.

(10) Patent No.: US 12,807,810 B2
(45) Date of Patent: Nov. 24, 2026

(54) POLYPHENYLENE SULFIDE COMPOSITIONS FOR LASER DIRECT STRUCTURING PROCESSES AND THE SHAPED ARTICLES THEREFORE

(71) Applicant: SHPP GLOBAL TECHNOLOGIES B.V., Bergen op Zoom (NL)

(72) Inventors: Shijie Song, Shanghai (CN); Yinlong Du, Shanghai (CN); Yapeng Fang, Shanghai (CN)

(73) Assignee: SHPP Global Technologies B.V., Bergen op Zoom (NL)

(*) Notice: Subject to any disclaimer, the term of this patent is extended or adjusted under 35 U.S.C. 154(b) by 693 days.

(21) Appl. No.: 18/267,833

(22) PCT Filed: Dec. 22, 2021

(86) PCT No.: PCT/IB2021/062188

§ 371 (c)(1),
(2) Date: Jun. 16, 2023

(87) PCT Pub. No.: WO2022/137163

PCT Pub. Date: Jun. 30, 2022

(65) Prior Publication Data

US 2024/0076494 A1 Mar. 7, 2024

(30) Foreign Application Priority Data

Dec. 22, 2020 (EP) .................................... 20216614

(51) Int. Cl.
*C08L 81/02* (2006.01)

(52) U.S. Cl.
CPC .................................... *C08L 81/02* (2013.01)

(58) Field of Classification Search
None
See application file for complete search history.

(56) References Cited

U.S. PATENT DOCUMENTS

2015/0175805 A1 6/2015 Schaefer

FOREIGN PATENT DOCUMENTS

| | | | | |
|---|---|---|---|---|
| CN | 108264767 | A | | 7/2018 |
| EP | 3543291 | A1 | | 9/2019 |
| EP | 3699234 | A1 | | 8/2020 |
| EP | 3730545 | A1 | | 10/2020 |
| JP | 2014-177571 | A | | 9/2014 |
| JP | 2017171731 | A | * | 9/2017 |
| KR | 10-2020-0070501 | A | | 6/2020 |
| WO | 2015/094805 | A1 | | 6/2015 |
| WO | 2015/144630 | A1 | | 10/2015 |
| WO | 2016/078488 | A1 | | 5/2016 |
| WO | 2018/130952 | A1 | | 7/2018 |
| WO | 2018/130970 | A1 | | 7/2018 |
| WO | 2020/116769 | A1 | | 6/2020 |
| WO | 2020/130365 | A1 | | 6/2020 |

OTHER PUBLICATIONS

International Search Report and Written Opinion mailed Mar. 2, 2022 in PCT/IB2021/062188 (12 pgs.).

* cited by examiner

*Primary Examiner* — Tae H Yoon
(74) *Attorney, Agent, or Firm* — Quicker Law, LLC

(57) ABSTRACT

Disclosed herein are compositions comprising: a. from about 30 wt. % to about 70 wt. % of a polyphenylene sulfide; b. from greater than 0 wt. % to about 10 wt. % of a resin comprising polyphenylene oxide; c. from about 5 wt. % to about 15 wt. % of a laser activable metal compound; and d. from about 10 wt. % to about 70 wt. % of an inorganic filler, wherein the combined weight percent value of all components does not exceed 100 wt. %, and all weight percent values are based on the total weight of the composition.

16 Claims, No Drawings

POLYPHENYLENE SULFIDE COMPOSITIONS FOR LASER DIRECT STRUCTURING PROCESSES AND THE SHAPED ARTICLES THEREFORE

CROSS-REFERENCE TO RELATED APPLICATION

This application is the National Stage of International Application No. PCT/IB2021/062188 filed Dec. 22, 2021, which claims priority to and the benefit of European Application No. 20216614.6 filed Dec. 22, 2020, the disclosures of which are incorporated herein by this reference in their entireties.

FIELD OF THE DISCLOSURE

The present disclosure relates to materials comprising polyphenylene sulfide, and in particular to polyphenylene sulfide materials for laser direct structuring applications.

BACKGROUND

Laser direct structuring (LDS) provides a process of applying a conductive pathway on non-conductive material surface. The process has been widely used in electronic applications such as antenna or circuit. Compared to the conventional methods, such as hot stamping and 2-shot molding, LDS shows a great deal of advantages in design capability, cycle time and cost efficiency, miniaturization, diversification and functionality of the devices. Many LDS compounds been developed based on various polymer resins including polycarbonate, polyamide, and polyester. Polyphenylene sulfide (PPS) would be a desirable base resin for LDS applications including antennae because the resin is cost-effective with well-balanced mechanical, heat, and dielectric properties. However, the development of PPS based LDS resins has been minimal.

There remains a need in the art for polyphenylene sulfide-based LDS materials.

SUMMARY

The above-described and other deficiencies of the art are met by thermoplastic compositions including: from about 30 wt. % to about 70 wt. % of a polyphenylene sulfide: from about greater than 0 wt. % to about 10 wt. % of a resin comprising polyphenylene oxide; from about 5 wt. % to about 15 wt. % of a laser activable metal compound: and from about 10 wt. % to about 70 wt. % of an inorganic filler. The combined weight percent value of all components does not exceed 100 wt. %, and all weight percent values are based on the total weight of the composition.

The above described and other features are exemplified by the following detailed description, examples, and claims.

DETAILED DESCRIPTION OF ILLUSTRATIVE EMBODIMENTS

The present disclosure may be understood more readily by reference to the following detailed description of desired embodiments and the examples included therein. In the following specification and the claims that follow, reference will be made to a number of terms which have the following meanings.

LDS processes, which can provide conductive structures on non-conductive plastic surfaces, have been widely used in electronic application. Compared to the conventional methods, such as hot stamping and two-shot molding, LDS has advantages in design capability, cycle time, cost efficiency, miniaturization, diversification, and functionality of a given device. To make the thermoplastics with LDS capability, a laser activatable (or activable) component is a necessary component to release metal seeds after laser treatment. There have been a number of LDS thermoplastics developed based on various polymer resins such as polycarbonate, polyamide, and polyester. However, there has been little progress made with polyphenylene sulfide as the base thermoplastic resin for LDS materials. PPS is a cost-effective resin with well-balanced mechanical, heat and dielectric properties, which makes the resin ideal for a number of LDS related applications, such as antenna and circuitry.

Although having generally desirable properties for LDS applications, it remains unclear as to why PPS resins are conventionally considered unsuitable for LDS applications. Without being bound to any particular theory, it is theorized that sulfide in both main polymer chain and end-capper of PPS resin reduces the activity of a laser activable additive present within the resin. This may be particularly apparent for copper-based LDS additives. However, conventional approaches to heavily increase the loading of LDS additive to improve LDS activity in a PPS resin matrix may diminish mechanical performance of the material and considerably increase cost. The low LDS activity of PPS resins has been an unsolved issue for quite a long time, that is why there is no mature PPS base LDS compounds in the market. Someone has tried to solve the activity issue by doping high loading of LDS additive, however, this approach will drop mechanical performance dramatically and be very costly, which has very little commercial value. From our study, it appears that using high molecular weight PPS resin is a promising way to address the LDS activity issue. PPS is kind of polymer that has sulfur on both mainchain and end-capper, while LDS process usually need copper as seeds to start plating process. However, copper and sulfur are very easy to form copper sulfide which is a high stable compound and thus dropping the activity of LDS additive. The sulfur exist on the mainchain has no reactivity with copper while the end-capper with derived from synthesizing and decomposition during processing will have reaction with copper. Following this idea, it makes sense that high Mw PPS will have relatively lower amount of end-capper and improve the LDS activity of PPS LDS compounds.

Provided herein are robust PPS based LDS compositions, which exhibit strong LDS performance, good flame retardancy, good mechanical performance (particularly, ductility), and good thermal stability.

International Published Patent Application No. WO 2020130365A1 discloses a polyphenylene sulfide resin composition for laser plating comprising PPS, an LDS additive, and glass fiber. These composites however include a plating seed production accelerator and do not incorporate polyphenylene oxide.

International Published Patent Application No. WO 2015094805A1 discloses a polyarylene sulfide composition comprising polyarylene sulfide, a laser activable additive, and a fibrous filler. The compositions do not include a polyphenylene oxide.

International Published Patent Application No. WO 2020116769A1 describes laser direct structuring resin compositions comprising a polyarylene sulfide, an LDS additive, and a reinforcing filler. The compositions do not include polyphenylene oxide.

Korean Patent Application No. KR 2020070501A discloses an LDS composition comprising a polyarylene sulfide resin, a reinforcing material, and an LDS additive that is surface modified with aminosilane. The compositions disclosed therein do not specifically provide a combination of polyarylene sulfide and polyphenylene oxide. Further, the application does not disclose both flame retardancy and high heat property.

International Published Patent Application No. WO 2015144630A1 describes thermoplastic compositions comprising a resin matrix, a reinforcement agent, and a laser direct structuring additive. These compositions however do not include a polyphenylene sulfide and polyphenylene oxide blend.

Thus although, certain PPS compositions have been prepared with LDS plating performance, the present disclosure combines a specific combination of PPS resins, PPO resins, LDS additive, and inorganic filler to flame retardancy, heat properties, mechanical performance as well as LDS plating performance.

Also, within the scope of the disclosure are articles of manufacture prepared according to any of the methods described herein. For example, articles that can be produced using the materials and methods of the disclosure include those in the electrical field, for example, computer, antenna and lighting articles.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, for example, combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of embodiments described in the specification.

Thermoplastic Composition

Aspects of the disclosure relate to thermoplastic composition comprising at least polyphenylene sulfide (PPS), a polyphenylene oxide PPO, a laser activable metal compound, and an inorganic filler.

In various aspects, the present disclosure provides composite materials useful for the manufacture of laser activable polyphenylene sulfide-based materials. These materials have been evaluated for flame retardance, heat deflection properties as well as mechanical performance. These materials exhibit certain plating properties. Laser platable thermoplastic compositions with robust LDS performance (specifically, a plating index greater than 0.7), good flame retardancy, high heat property (specifically, a heat deflection temperature greater than 270 °C at 0.45 megapascals (MPa) in accordance with ISO-75), and balanced mechanical performance have been developed based on the building blocks of PPS, PPO, laser achievable metal compounds and fillers. PPS with high viscosity (a melt volume flow rate less than 50 cubic centimeters per 10 minutes, $cm^3/10$ min. at 300 °C/2.16 kg testing conditions) and high molecular weight (Mw greater than 40,000 Daltons and Mn greater than 9,000 as tested by gel permeation chromatography GPC method) was found to be critical for robust LDS activity. Antimony doped tin oxide was found to be an effective LDS additive for PPS. By combing PPS and PPO with a blended LDS additive system, plating performance of the compositions was further improved. Plating index (PI) of the compositions is greater than 0.7, indicating that the developed PPS based LDS compound had very good plating performance.

Polyphenylene Sulfide

In various aspects, the disclosed composition may comprise a polyarylene sulfide, such as a polyphenylene sulfide (PPS). PPS may describe polymers containing optionally substituted phenyl rings linked with (S) and can be used interchangeably with poly (2,6 dimethyl-p-phenylene sulfide). Further, the disclosed composition may comprise a specific combination of PPO resins that provide the composition with a balance of certain properties.

The PPS polymer has at least 50 mol % of a recurring unit (1), relative to the total number of recurring units in the PPS polymer. In some aspects, the PPS polymer has at least 60 mol %, at least 70 mol %, at least 80 mol %, at least 90 mol %, at least 95 mol % or at least 99 mol % recurring unit , relative to the total number of recurring units in the PPS polymer. Recurring unit (1) is represented by the following formula:

(1)

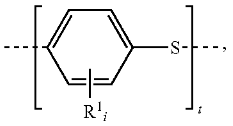

where $R^1$ at each location, is independently selected from the group consisting of an alkyl, an aryl, an alkoxy, an aryloxy, an alkylketone, an arylketone, a fluoroalkyl, a fluoroaryl, a bromoalkyl, a bromoaryl, a chloroalkyl, a chloroaryl, an alkylsulfone, an arylsulfone, an alkylamide, an arylamide, an alkylester, an arylester, a fluorine, a chlorine, and a bromine; i is an integer from 0 to 4, preferably 0; and t is an integer greater than 50, preferably greater than 100. As used herein, a dashed bond indicates a bond to an atom outside the recurring unit. For example, the dashed bond can be a bond to an identical recurring unit, a different recurring unit, or an atom of a non-recurring unit (more specifically, an end-capper). The PPS polymer can include one or more additional recurring units (1). In such cases, each additional recurring unit may be distinct from each other and from another.

In various aspects, the PPS polymer may include a metal end-capping agent, including but not limited to, sodium end-capping agents. The sodium end-capping agents are represented by a formula selected from the following group of formulae:

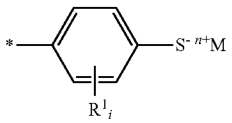

where M is Na and n is 2. A person of ordinary skill in the art will recognize that a PPS polymer includes many polymer chains having two chain ends (terminal ends). Accordingly, such chains can have 0 to 2 end-capping agents. End-capping agents with M as Na are referred to as sodium end-capping agents.

The polyphenylene sulfide may have a particular viscosity. In various aspects, the polyphenylene sulfide may have a high viscosity. High viscosity may be characterized as a melt volume rate less than less than 50 cubic centimeters per 10 minutes ($cm^3$/10 min.) at 300 °C/2.16 kg testing conditions when tested in accordance with ISO-1133.

The polyphenylene sulfide may have a particular molecular weight. In certain aspects, the polyphenylene sulfide may have a high molecular weight. More specifically, the polyphenylene sulfide may have a molecular weight greater than 40,000 Daltons. In yet further aspects, the polyphenylene sulfide may have a Mn greater than 9,000 Daltons.

The disclosed polyphenylene sulfide may have certain endcapping groups. It was surprisingly found that PPS polymers, terminated with specific end-capping agents in specific amounts, had significantly improved melt stability. For example, a PPS polymer having an —SH endcapping group and MVR greater than 150 $cm^3$/10 minutes at 300 °C, 1000 s−1 or less than 50 $cm^3$/10 minutes at 300 °C and 2.16 kg when tested in accordance with ISO-1133 may result in improved plating performance (namely a plating index greater than 0.7 when tested according to a resonant ca. Because of the significantly improved melt stability, the PPS polymers can be advantageously incorporated into melt processing techniques.

Polyphenylene sulfide may be present in the disclosed compositions in an amount of about 30 wt. % to about 70 wt. % based on the total weight of the composition. For example, polyphenylene sulfide may be present in the amount of 30 wt. % to 65 wt. %, 25 wt. % to 70 wt. %, 28 wt. % to 70 wt. %, 40 wt. % to 65 wt. %, 25 wt. % to 75 wt. %, 50 wt. % to 70 wt. %, or 30 wt. % to 75 wt. %.

Polyphenylene Oxide

In various aspects, the disclosed composition may comprise a polyphenylene ether such as polyphenylene oxide (a "poly(p-phenylene oxide") PPO. PPO may describe polymers containing optionally substituted phenyl rings linked with oxygen (O) and can be used interchangeably with poly(p-phenylene ether) or poly (2,6 dimethyl-p-phenylene oxide). Further, the disclosed composition may comprise a specific combination of PPO resins that provide the composition with a balance of certain properties.

The polyphenylene oxide may be present as a polyphenylene oxide resin. In further aspects, the polyphenylene oxide may be present as a polyphenylene oxide copolymer.

Certain aspects of the composition include from about 0 wt. % to about 10 wt. % of a polyphenylene oxide or a polyphenylene oxide copolymer. Polyphenylene sulfide may be present in the disclosed compositions in an amount of about 30 wt. % to about 70 wt. % based on the total weight of the composition. For example, polyphenylene sulfide may be present in the amount of 0.01 wt. % to 10 wt. %, 0.1 wt. % to 10 wt. %, 1 wt. % to 10 wt. %, 2 wt. % to 10 wt. %, 3 wt. % to 10 wt. %, 0.01 wt. % to 8 wt. %, 0.1 wt. % to 8 wt. %, 1 wt. % to 8 wt. %, 2 wt. % to 8 wt. %, 3 wt. % to 8 wt. %, 0.01 wt. % to 6 wt. %, 0.1 wt. % to 6 wt. %, 1 wt. % to 6 wt. %, 2 wt. % to 6 wt. %, or from about 3 wt. % to 6 wt. %.

Laser Activable Compound

The compositions of the present disclosure also include a laser activable or laser direct structuring (LDS) additive. The LDS additive may be selected to enable the composition to be used in a laser direct structuring process. In an LDS process, a laser beam exposes the LDS additive to place it at the surface of the thermoplastic composition and to activate metal atoms from the LDS additive. As such, the LDS additive is selected such that, upon exposed to a laser beam, metal atoms are activated and exposed and in areas not exposed by the laser beam, no metal atoms are exposed. In addition, the LDS additive is selected such that, after being exposed to laser beam, the etching area is capable of being plated to form conductive structure.

As used herein, laser activatable, as in laser activatable additive may refer to an additive or agent that is activated by a physical-chemical reaction induced by laser energy such as a focused laser beam. For example, a laser-activatable additive may be introduced into a thermoplastic. The additive may be activated by a laser beam. A physical-chemical reaction forms metallic nuclei. These nuclei may act as a catalyst for reductive copper plating. In addition to activation, the laser beam may create a microscopically rough surface at which the copper is anchored during a metallization process.

As used herein "capable of being plated" refers to a material wherein a substantially uniform metal plating layer can be plated on laser-etched area. This process is different than laser marking wherein the main outcome of laser marking is a color change in the material under the effect of energy radiation. The key characterization for laser marking is the contrast between the mark and the substrate.

Conversely, for LDS, the goal is the formation of metal seeds on the laser etched surface, and the final metallization layer during the following plating process. Plating rate and adhesion of plated layers are the key evaluation requirements. Color here means the substrate made from these materials itself not the color change under the laser radiation. As such, in addition to enabling the composition to be used in a laser direct structuring process, the LDS additive used in the present disclosure is also selected to help enable the composition to be colored while maintaining physical properties.

The LDS additive may be selected such that, after activating with a laser, the conductive path can be formed by a standard electroless plating process. When the LDS additive is exposed to the laser, elemental metal is released. The laser draws the circuit pattern onto the part and leaves behind a roughened surface containing embedded metal particles. These particles act as nuclei for the crystal growth during a subsequent plating process, such as a copper plating process. Other electroless plating processes that can be used include, but are not limited to, gold plating, nickel plating, silver plating, zinc plating, tin plating or the like.

Aspects of the thermoplastic composition include a laser direct structuring (LDS) additive. In certain aspects, the LDS additive includes copper chromite black, copper hydroxide phosphate, tin-antimony cassiterite grey or a combination thereof. Cassiterite may refer to a tin oxide material. An exemplary copper chromite black LDS additive is Black 1G, available from The Shepherd Color Company. An exemplary copper hydroxide phosphate is Iriotec™

8840, available from Merck. An exemplary tin-antimony cassiterite grey (antimony doped tin oxide) is S-5000, available from Ferro.

In some aspects, the LDS additive may be present in the thermoplastic composition in an amount of from 0.5 wt. % to 20 wt. %, or from about 0.5 wt. % to about 20 wt. %. In further aspects, the LDS additive may be present in the thermoplastic composition in an amount of from 0.5 wt. % to 15 wt. %, or from about 0.5 wt. % to about 15 wt. %, or 1 wt. % to 10 wt. % or from about 1 wt. % to about 10 wt. %, or from 2 wt. % to 12 wt. % or from about 2 wt. % to about 12 wt. %, or from 2 wt. % to 8 wt. % or from about 2 wt. % to about 8 wt. %, or from 3 wt. % to 6 wt. % or from about 3 wt. % to about 6 wt. %. In various examples, the composition may comprise a combination of LDS additives. The amount of the LDS additive included is sufficient to enable plating of the track formed after activation by the laser while not adversely affecting mechanical properties. In some aspects, for purposes of the present disclosure, titanium dioxide (when present) may be excluded from the amount of LDS present in the thermoplastic composition.

It is believed that the LDS additive contributes to the thermoplastic composition having an improved plating index as compared to a thermoplastic composition without an LDS additive.

As used herein, plating index may be defined as the ratio between average copper thickness obtained under a specific laser parameter of the tested sample and that of the reference sample. The reference sample used herein was a PBT based LDS with commercial name of Pocan™ DP 7102. Generally, a plating index of greater than 0.7 is desirable.

Plating index may be determined by a two-step process of laser etching and copper chemical deposition for 45 minutes according to the "LPKF Method" or "LPKF-LDS Method" established by LPKF Laser & Electronics. In the first step, molded plaques of the materials to be evaluated (for example, the thermoplastic composition) are laser etched/structured with the LPKF pattern, in which the laser variables are power, frequency and speed. Following this step, the laser structured plaque and one reference stick (reference material commercially available Pocan™ DP 7102 from Lanxess) are placed in the copper bath until the reference stick has a copper thickness of nearly 5 μm. The plaque and reference stick are then removed, rinsed and dried, and the copper thicknesses for the reference stick are measured twice on each side by an XRF method (in accordance with ASTM B568 (2014)) and averaged over all four points. This is noted as $X_{ref}$. Then, two points are measured for each parameter field and averaged for each field. Plating index can then be calculated as:

$$\text{Plating index} = \frac{\text{Average copper thickness for one parameter field}}{\text{Average copper thickness for reference stick } X_{ref}}$$

Thus, in some aspects, the thermoplastic composition has a plating index of at least 0.15. In other aspects, the thermoplastic composition has a plating index of at least 0.20, or at least 0.25, or at least 0.30, or at least 0.35, or at least 0.40, or at least 0.45, or at least 0.50, or at least 0.55, or at least 0.60, or at least 0.65, or at least 0.70.

LDS additives used in the present disclosure may have a core-shell (or, designated as core/shell) structure where a core is coated with a laser activatable component (namely, the shell). The 'laser activatable component' is a component that releases metal seeds after laser activating. The metal seeds may act as catalysts for chemical plating.

Inorganic Filler

The present compositions may comprise an inorganic filler or reinforcing agent. The specific composition of filler, if present, can vary, provided that the filler is chemically compatible with the remaining components of the thermoplastic composition.

Suitable inorganic fillers may comprise, but are not limited to, metal silicates and silica powders; boron-containing oxides of aluminum (Al), magnesium (Mg), or titanium (Ti); anhydrous or hydrated calcium sulfate; wollastonite; hollow and/or solid glass spheres; kaolin; single crystal metallic or inorganic fibers or "whiskers"; glass fibers (including continuous and chopped fibers, including flat glass fibers) ; sulfides of molybdenum (Mo) or zinc (Zn); barium compounds; metals and metal oxides; flaked fillers; fibrous fillers; short inorganic fibers reinforcing organic fibrous fillers formed from organic polymers capable of forming fibers (e.g., polyether ether ketone (PEEK), polyetherimide (PEI), polytetrafluoroethylene (PTFE), polyphenylene sulfide (PPS)); and fillers and reinforcing agents such as mica, clay, feldspar, flue dust, fillite, quartz, quartzite, perlite, tripoli, diatomaceous earth, carbon black, or the like, or combinations comprising at least one of the foregoing fillers or reinforcing agents. In some aspects, the filler(s) can comprise inorganic materials which can include clay, titanium oxide, asbestos fibers, silicates and silica powders, boron powders, calcium carbonates, talc, kaolin, sulfides, barium compounds, metals and metal oxides, wollastonite, glass spheres, glass fibers, flaked fillers, fibrous fillers, natural fillers and reinforcements, and reinforcing organic fibrous fillers. In certain aspects, the composite may comprise a glass fiber filler. In yet further aspects, the composite may be free or substantially free of a glass filler. In one aspect, the composition comprises an inorganic filler selected from glass fiber, glass flake, talc, clay, mica, wollastonite, titanium dioxide, or a combination thereof. mineral filler such as talc.

In some examples, the ceramic filler component may be present in the amount of about 10 wt. % to about 70 wt. %. In further examples, the ceramic filler may be present in an amount from 10 wt. % to about 60 wt. %, 10 wt. % to about 50 wt. %, 15 wt. % to about 50 wt. %, 15 wt. % to about 45 wt. %, 20 wt. % to about 70 wt. %, 20 wt. % to about 65 wt. %, 25 wt. % to about 70 wt. %, or 25 wt. % to about 60 wt. %.

Additives

The composition can include various additives ordinarily incorporated into polymer compositions of this type, with the proviso that the additive(s) are selected so as to not significantly adversely affect the desired properties of the thermoplastic composition (good compatibility for example). Such additives can be mixed at a suitable time during the mixing of the components for forming the composition. The total amount of all of the additives in the resin composition can be, for example, 0.001 to 12 wt. % each based on the total weight of the composition. Suitable additives can include ultraviolet agents, ultraviolet stabilizers, heat stabilizers, antistatic agents, anti-microbial agents, anti-drip agents, radiation stabilizers, pigments, dyes, fibers, fillers, plasticizers, fibers, flame retardants, antioxidants, lubricants, wood, glass, and metals, and combinations thereof.

According to certain aspects, the polymer compositions may maintain mechanical performance and dielectric strength even with high levels of fillers (for example, greater than 30 wt. % filler based on the total weight of the polymer composition).

The composite disclosed herein can comprise one or more additional fillers. The filler can be selected to impart additional impact strength and/or provide additional characteristics that can be based on the final selected characteristics of the polymer composition. In certain aspects, the composite may comprise a glass fiber filler. In yet further aspects, the composite may be free or substantially free of a glass filler.

Additional appropriate fillers or reinforcing agents can include, for example, mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, cenospheres, aluminosilicate or (armospheres), kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, titanium dioxide, aluminum oxide, magnesium oxide, particulate or fibrous aluminum, bronze, zinc, copper, or nickel, glass flakes, flaked silicon carbide, flaked aluminum diboride, flaked aluminum, steel flakes, natural fillers such as wood flour, fibrous cellulose, cotton, sisal, jute, starch , lignin, ground nut shells, or rice grain husks, reinforcing organic fibrous fillers such as poly(ether ketone), polyimide, polybenzoxazole, poly(phenylene sulfide), polyesters, polyethylene, aromatic polyamides, aromatic polyimides, polyetherimides, polytetrafluoroethylene, and poly(vinyl alcohol), as well combinations comprising at least one of the foregoing fillers or reinforcing agents. The fillers and reinforcing agents can be coated, or surface treated, with silanes for example, to improve adhesion and dispersion with the polymer matrix. Fillers generally can be used in amounts of 1 to 200 parts by weight, based on 100 parts by weight of based on 100 parts by weight of the total composition.

The additive composition can include a flow modifier, reinforcing agent, antioxidant, heat stabilizer, light stabilizer, ultraviolet light stabilizer, ultraviolet absorbing additive, plasticizer, lubricant, release agent, antistatic agent, anti-fog agent, antimicrobial agent, chain extender, colorant, de-molding agents, flow promoter, flow modifier, surface effect additive, radiation stabilizer, flame retardant, anti-drip agent, or any combination thereof.

Heat stabilizer additives include organophosphites (e.g. triphenyl phosphite, tris-(2,6-dimethylphenyl)phosphite, tris-(mixed mono-and di-nonylphenyl)phosphite or the like), phosphonates (e.g., dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate available as IRGAPHOS™ 168. Heat stabilizers are generally used in amounts of 0.01 to 5 wt. %, based on the total weight of polymer in the composition.

There is considerable overlap among plasticizers, lubricants, and mold release agents, which include, for example, glycerol tristearate (GTS), phthalic acid esters (e.g., octyl-4,5-epoxy-hexahydrophthalate), tris-(octoxycarbonylethyl) isocyanurate, tristearin, di- or polyfunctional aromatic phosphates (e.g., resorcinol tetraphenyl diphosphate (RDP), the bis(diphenyl) phosphate of hydroquinone and the bis(diphenyl) phosphate of bisphenol A); poly-alpha-olefins; epoxidized soybean oil; silicones, including silicone oils (for example, poly(dimethyl diphenyl siloxanes); esters, for example, fatty acid esters (for example, alkyl stearyl esters, such as, methyl stearate, stearyl stearate, and the like), waxes (for example, beeswax, montan wax, paraffin wax, or the like), or combinations comprising at least one of the foregoing plasticizers, lubricants, and mold release agents. These are generally used in amounts of 0.01 to 5 wt. %, based on the total weight of the polymer in the composition.

Light stabilizers, in particular ultraviolet light (UV) absorbing additives, also referred to as UV stabilizers, include hydroxybenzophenones (e.g., 2-hydroxy-4-n-octoxy benzophenone), hydroxybenzotriazines, cyanoacrylates, oxanilides, benzoxazinones (e.g., 2,2'-(1,4- phenylene)bis (4H-3,1-benzoxazin-4-one, commercially available under the trade name CYASORB™ UV-3638 from Cytec Industries Inc., Woodland, NJ), aryl salicylates, hydroxybenzotriazoles (e.g., 2-(2-hydroxy-5-methylphenyl)benzotriazole, 2-(2-hydroxy-5-tert-octylphenyl)benzotriazole, and 2-(2H-benzotriazol-2-yl)-4-(1,1,3,3-tetramethylbutyl)-phenol, commercially available under the trade name CYASORB™ 5411 from Cytec Industries Inc., Woodland, NJ) or combinations comprising at least one of the foregoing light stabilizers. The UV stabilizers can be present in an amount of 0.01 to 1 wt. %, specifically, 0.1 to 0.5 wt. %, and more specifically, 0.15 to 0.4 wt. %, based upon the total weight of polymer in the composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. Antioxidants are used in amounts of 0.01 to 0.1 parts by weight, based on 100 parts by weight of the total composition, excluding any filler.

Useful flame retardants include organic compounds that include phosphorus, bromine, and/or chlorine. Non-brominated and non-chlorinated phosphorus-containing flame retardants can be preferred in certain applications for regulatory reasons, for example organic phosphates and organic compounds containing phosphorus-nitrogen bonds.

Inorganic flame retardants can also be used, for example salts of C1-16 alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, and/or $Na_3AlF_6$. When present, inorganic flame retardant salts are present in amounts of 0.01 to 10 parts by weight, more specifically 0.02 to 1 parts by weight, based on 100 parts by weight of the total composition, excluding any filler.

Anti-drip agents can also be used in the composition, for example a fibril forming or non-fibril forming fluoropolymer such as polytetrafluoroethylene (PTFE). The anti-drip agent can be encapsulated by a rigid copolymer, for example styrene—acrylonitrile copolymer (SAN). PTFE encapsulated in SAN is known as TSAN. A TSAN comprises 50 wt. % PTFE and 50 wt. % SAN, based on the total weight of the encapsulated fluoropolymer. The SAN can comprise, for example, 75 wt. % styrene and 25 wt. % acrylonitrile based on the total weight of the copolymer. Antidrip agents can be used in amounts of 0.1 to 10 parts by weight, based on 100 parts by weight of the total composition, excluding any filler.

The resin compositions can be formed by techniques known to those skilled in the art. Extrusion and mixing techniques, for example, may be utilized to combine the components of the resin composition.

The resin compositions of the present disclosure can be blended with the aforementioned ingredients by a variety of methods involving intimate admixing of the materials with any additional additives desired in the formulation. Because of the availability of melt blending equipment in commercial polymer processing facilities, melt processing methods are generally preferred. Illustrative examples of equipment used in such melt processing methods include co-rotating and counter-rotating extruders, single screw extruders, co-kneaders, disc-pack processors and various other types of extrusion equipment. The temperature of the melt in the present process is preferably minimized in order to avoid excessive degradation of the resins. It is often desirable to maintain the melt temperature between about 230 °C and about 350 °C in the molten resin composition, although higher temperatures can be used provided that the residence time of the resin in the processing equipment is kept short. In some aspects the melt processed composition exits processing equipment such as an extruder through small exit holes in a die. The resulting strands of molten resin are cooled by passing the strands through a water bath. The cooled strands can be chopped into small pellets for packaging and further handling.

Compositions may be manufactured by various methods, including batch or continuous techniques that employ kneaders, extruders, mixers, and the like. For example, the composition can be formed as a melt blend employing a twin-screw extruder. In some aspects at least some of the components are added sequentially. For example, the poly (arylene ether) component, the polystyrene component(s), and the impact modifier component can be added to the extruder at the feed throat or in feeding sections adjacent to the feed throat, or in feeding sections adjacent to the feed throat, while the filler component can be added to the extruder in a subsequent feeding section downstream. Alternatively, the sequential addition of the components may be accomplished through multiple extrusions. A composition may be made by preextrusion of selected components, such as the poly(arylene ether) component, the polystyrene component(s), and the impact modifier component to produce a pelletized mixture. A second extrusion can then be employed to combine the preextruded components with the remaining components. The filler component can be added as part of a masterbatch or directly. The extruder can be a two lobe or three lobe twin screw extruder.

In one aspect, the present disclosure pertains to plastic components, for example, that have been shaped, formed, or molded at least in part from the compositions described herein. Also provided are plastic components comprising a resin composition that is formed according to the presently disclosed methods for forming a resin composition.

Properties and Articles

The disclosed compositions exhibit a balance among dielectric and physical properties. These compositions achieve a high Dk, low DF, high heat deflection temperature HDT (for example, greater than 280 °C at 0.45 MPa or greater than 255 °C at 1.82 MPa according to ISO-75,) and strong mechanical properties. Further, the disclosed compositions may be less dense than comparative compositions, making them more appealing for certain manufacturing specifications.

In certain aspects, the disclosed composites may exhibit certain dielectric properties. A molded article or plaque comprising the composite may exhibit a dissipation factor Df (tan delta, $\varepsilon''/\varepsilon'$) less than 0.005 at frequencies of about 10 to about 120 GHz, or at frequencies from 1 MHz to 100 GHz, or from about 1-20 GHz, 1-25 GHz, 1-100 GHZ, 50-100 GHz, or 70-90 GHz when measured according to a resonant cavity method. In further aspects, a molded article or plaque comprising the composite may exhibit a dielectric constant Dk greater than 4 at a frequency of 1.1 GHz when measured according to a resonant cavity method.

The disclosed compositions further exhibit high heat resistance, high flowability, and improved ductility. The compositions may exhibit a high heat resistance characterized by a heat deflection temperature of greater than 270 °C at 0.45 megapascals (MPa) or greater than 250 °C at 1.8 MPa, when tested in accordance with ISO 75. The compositions may exhibit a reduced density, namely less than 1.7 $g/cm^3$ when tested in accordance with ISO-1183Further, the compositions may exhibit improved ductility which may be characterized by a notched Izod impact strength greater than 5 $KJ/m^2$.

The disclosed compositions may exhibit certain laser plating performance as characterized according to the plating index. Plating index may be defined as the ratio between average copper thickness obtained under a specific laser parameter of the tested sample and that of the reference sample. In certain aspects, the reference sample was a commercially available PBT based LDS product (Pocan DP 7102). Aspects of the present disclosure may provide compositions having a plating index greater than 0.45, greater than, 0.5, greater than 0.7, greater than 0.72, greater than 0.75, for example. Furthermore, compositions of the present disclosure may achieve the disclosed plating index in the absence of a plating seed promoter (or plating seed generation promoter) as described in the art (for example, EP 3699234). As such, the disclosed compositions may be free of, or substantially free of a plating seed generation promoter.

In various aspects, the present disclosure relates to articles comprising the compositions herein. The compositions can be molded into useful shaped articles by a variety of means such as injection molding, extrusion, rotational molding, blow molding and thermoforming to form articles. The compositions can be useful in the manufacture of articles requiring materials with good flow, good impact strength, and good dielectric strength. The compositions may be useful for as well as electrically conducting purposes.

In various aspects, the present disclosure provides composite materials useful for the manufacture of phase shifters for base stations than can adjust the incident transmission angle of an antenna in a base station. These materials have been evaluated for dielectric properties, such as dissipation factor Df, among others, at frequencies from about 10 GHz and 120 GHz. The disclosed compositions may be useful as a dielectric plate for a phase shifter for a 5G base station.

The advantageous characteristics of the compositions disclosed herein make them appropriate for an array of uses.

Methods of Manufacture

Aspects of the disclosure further relate to methods for making a thermoplastic composition. The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semi-crystalline organic polymer, or the flow point (for example, the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230 °C and about 350 °C, although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Methods may further comprise processing the composite to provide a plaque of a desired thickness. Plaques can be extruded, injection molded, compression molded, or injection-compression molded, and may have a thickness between about 0.5 mm and 6 mm. Other processes could also be applied to the thin thermoplastic film, including but not limited to, lamination, co-extrusion, thermo-forming or hot pressing. In such aspects, further layers of other materials (for example, other thermoplastic polymer layers, metallic layers, etc.) could be combined with the composite.

Various combinations of elements of this disclosure are encompassed by this disclosure, e.g., combinations of elements from dependent claims that depend upon the same independent claim.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "a thermoplastic polymer component" includes mixtures of two or more thermoplastic polymer components. As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additional processes" means that the additional processes can or cannot be included and that the description includes methods that both include and that do not include the additional processes.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding aspects to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "residues" and "structural units", used in reference to the constituents of the polymers, are synonymous throughout the specification.

As used herein the terms "weight percent," "wt. %," and "wt. %," which can be used interchangeably, indicate the percent by weight of a given component based on the total weight of the composition, unless otherwise specified. That is, unless otherwise specified, all wt. % values are based on the total weight of the composition. It should be understood that the sum of wt. % values for all components in a disclosed composition or formulation is 100.

Unless otherwise stated to the contrary herein, all test standards are the most recent standard in effect at the time of filing this application.

As used herein, the terms "number average molecular weight" or "Mn" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g., polycarbonate standards or polystyrene standards, preferably certified or traceable molecular weight standards.

As used herein, the terms "weight average molecular weight" or "Mw" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g. polycarbonate polymers, by methods well known to a person having ordinary skill in the art using molecular weight standards, e.g. polycarbonate standards or polystyrene standards, preferably certified or traceable molecular weight standards.

The terms "polycarbonate" or "polycarbonates" as used herein includes copolycarbonates, homopolycarbonates and (co)polyester carbonates.

As used herein, degree of polymerization, n, may describe the number of monomeric units (or repeating units) in a given polymer molecule.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

In one aspect, "substantially free of" can be less than about 0.5 weight percent (wt. %). In another aspect, substantially free of can be less than about 0.1 wt. %. In another aspect, substantially free of can be less than about 0.01 wt. %. In yet another aspect, substantially free of can be less than about 100 ppm. In yet another aspect, substantially free can refer to an amount, if present at all, below a detectable level.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Aspects of the Disclosure

In various aspects, the present disclosure pertains to and includes at least the following aspects.

Aspect 1A. A thermoplastic composition comprising: from about 30 wt. % to about 70 wt. % of a polyphenylene sulfide; from about greater than 0 wt. % to about 10 wt. % of a resin comprising polyphenylene oxide; from about 5 wt. % to about 15 wt. % of a laser activable metal compound; and from about 10 wt. % to about 70 wt. % of an inorganic filler, wherein the combined weight percent value of all components does not exceed 100 wt. %, and all weight percent values are based on the total weight of the composition.

Aspect 1B. A thermoplastic composition consisting essentially of: from about 30 wt. % to about 70 wt. % of a polyphenylene sulfide; from about greater than 0 wt. % to about 10 wt. % of a resin comprising polyphenylene oxide; from about 5 wt. % to about 15 wt. % of a laser activable metal compound; and from about 10 wt. % to about 70 wt. % of an inorganic filler, wherein the combined weight percent value of all components does not exceed 100 wt. %, and all weight percent values are based on the total weight of the composition.

Aspect 1C. A thermoplastic composition consisting of: from about 30 wt. % to about 70 wt. % of a polyphenylene sulfide; from about greater than 0 wt. % to about 10 wt. % of a resin comprising polyphenylene oxide; from about 5 wt. % to about 15 wt. % of a laser activable metal compound; and from about 10 wt. % to about 70 wt. % of an inorganic filler, wherein the combined weight percent value of all components does not exceed 100 wt. %, and all weight percent values are based on the total weight of the composition.

Aspect 2. The thermoplastic composition according to aspect 1A-C, wherein the polyphenylene sulfide has a melt volume rate (MVR) when tested in accordance with ISO-1133 of less than 50 cubic centimeters per 10 minutes ($cm^3$/10 min), under 300 °C/2.16 kg testing condition.

Aspect 3. The thermoplastic composition according to aspects 1A-C, wherein the polyphenylene sulfide has a number-average molecular weight $M_n$ greater than 9000 Daltons according to a GPC method.

Aspect 4. The thermoplastic composition according to aspects 1A-C, wherein the polyphenylene sulfide is a linear polyphenylene sulfide.

Aspect 5. The thermoplastic composition according to any one of aspects 1A-$_4$, wherein the resin comprising polyphenylene oxide is polyphenylene oxide or a polyphenylene oxide copolymer.

Aspect 6. The thermoplastic composition according to any one of aspects 1A-$_4$, wherein the resin comprising polyphenylene oxide is polyphenylene oxide or a polyphenylene oxide siloxane copolymer.

Aspect 7. The thermoplastic composition according to any one of aspects 1A-$_6$, wherein the laser activable metal compound comprises antimony-doped tin oxide or copper chromite oxide or copper hydroxide phosphate or their combination.

Aspect 8. The thermoplastic composition according to any one of aspects 1A-7, wherein the inorganic filler comprises glass fiber, glass flake, talc, clay, mica, wollastonite, titanium dioxide, or a combination thereof.

Aspect 9. The thermoplastic composition according to any one of aspects 1A to 8, wherein the laser activable metal compound comprises antimony-doped tin oxide, copper chromite, or copper hydroxide phosphate.

Aspect 10. The thermoplastic composition according to any one of aspects 1 to 8, wherein the laser activable metal compound comprises antimony-doped tin oxide.

Aspect 11. The thermoplastic composition according to any one of aspects 1A to 9, wherein the composition exhibits a plating index of greater than 0.7 according to an LPKF-LDS Method.

Aspect 12. The thermoplastic composition according to any one of aspects 1A to 11, wherein the thermoplastic composition further comprises at least one additional additive, wherein the at least one additional additive comprises a filler, acid scavenger, anti-drip agent, antioxidant, antistatic agent, chain extender, colorant, de-molding agent, flow promoter, lubricant, mold release agent, plasticizer, quenching agent, flame retardant, UV reflecting additive, and combinations thereof.

Aspect 13. An article formed from the thermoplastic composition according to any one of aspects 1A to 12.

Aspect 14. The article according to aspect 13, wherein the article is a component of an electronic device.

Aspect 15. A thermoplastic composition comprising: from about 30 wt. % to about 70 wt. % of a polyphenylene sulfide; from 0.01 wt. % to about 8 wt. % of a resin comprising polyphenylene oxide; from about 5 wt. % to about 15 wt. % of a laser activable metal compound; and from about 10 wt. % to about 70 wt. % of an inorganic filler, wherein the combined weight percent value of all components does not exceed 100 wt. %, and all weight percent values are based on the total weight of the composition.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (for example, amounts, temperature), but some errors and deviations should be accounted for. Unless indicated otherwise, parts are parts by weight, temperature is in °C or is at ambient temperature, and pressure is at or near atmospheric. Unless indicated otherwise, percentages referring to composition are in terms of wt. %.

There are numerous variations and combinations of mixing conditions, e.g., component concentrations, extruder design, feed rates, screw speeds, temperatures, pressures and other mixing ranges and conditions that can be used to optimize the product purity and yield obtained from the described process. Only reasonable and routine experimentation will be required to optimize such process conditions.

Various PPS resins were prepared from the neat resins presented in Table 1. The polyphenylene resins differ according to the end-capper or melt volume rate.

TABLE 1

PPS resins investigated.

| Item | Grade | Flow | End-capper | MVR at (300° C., 1000 $s^{-1}$) | MVR (300° C./2.16 kg) |
|---|---|---|---|---|---|
| PPS-1 | 1150C | High | –SNa | 96.1 | 120 |
| PPS-2 | 3450 | High | –SH | 92.8 | 120.4 |
| PPS-3 | 3418 | Low | –SH | 158.6 | 46.7 |

Further components are presented in Table 2.

TABLE 2

| Materials and suppliers. | | |
|---|---|---|
| Description | Supplier | Trade name |
| Polyphenylene oxide (PPO); 0.4 dl/g intrinsic viscosity | SABIC | PPO 640 |
| Glass fiber (GF); E-glass, sized for polyphenylene sulfide | Jushi | ECS-10-3-584 |
| LDS Additive 1 (LDS1); copper chromite oxide | Shephard | Black 1G |
| LDS Additive 2 (LDS2); antimony doped tin oxide | Ferro | S-5000 |
| Titanium dioxide ($TiO_2$) | Chemours | R-350 |
| Polyether ether ketone (PEEK) | Victrex | 90P |
| Silane; coupling agent to enhance adhesion between glass fiber and resin | Momentive | A-186 |
| Anti-oxidant (AOX1) | DOVERPHOS | S-9228 |
| Anti-oxidant (AOX2) | BASF | Irganox ™ 1010 |
| Mold Release (MR) | FACI | Glycolube ™ P (ETS) |

Compounding processes were performed on a lab extruder (Toshiba TEM-37BS). If not specifically noted, all the thermoplastic resin, fillers, and additives ere fed from the extruder throat. The compounding was performed with screw rotations at 300 RPB and 30-40 kg/h output with torque about 50-60%. The temperature profile and molding conditions are shown in Tables 3 and 4.

TABLE 3

| Temperature profiles for compounding. | | |
|---|---|---|
| Parameters | Unit | Extrusion Condition |
| Compounder Type | NONE | TEM-37BS |
| Barrel Size | mm | 1500 |
| Die | mm | 4 |
| Zone 1 Temp | ° C. | 90 |
| Zone 2 Temp | ° C. | 220 |
| Zone 3 Temp | ° C. | 270 |
| Zone 4 Temp | ° C. | 290 |

TABLE 3-continued

| Temperature profiles for compounding. | | |
|---|---|---|
| Parameters | Unit | Extrusion Condition |
| Zone 5 Temp | ° C. | 310 |
| Zone 6 Temp | ° C. | 310 |
| Zone 7 Temp | ° C. | 310 |
| Zone 8 Temp | ° C. | 320 |
| Zone 9 Temp | ° C. | 320 |
| Zone 10 Temp | ° C. | 320 |
| Zone 11 Temp | ° C. | 320 |
| Die Temp | ° C. | 320 |
| Screw speed | rpm | 300 |
| Throughput | kg/hr | 30-40 |
| Torque | NONE | 50-60 |
| Vacuum 1 | MPa | −0.08 |
| Side Feeder 1 speed | rpm | 250 |
| Melt temperature | NONE | 290-310 |

TABLE 4

| Injection molding conditions. | | |
|---|---|---|
| Parameters | Unit | Molding Condition |
| Cnd: Pre-drying time | Hour | 4 |
| Cnd: Pre-drying temp | ° C. | 120 |
| Mold Type (insert) | NONE | ISO Tensile, Flexural, Izod bars, Plaques |
| Hopper temp | ° C. | 50 |
| Zone 1 temp | ° C. | 290 |
| Zone 2 temp | ° C. | 320 |
| Zone 3 temp | ° C. | 320 |
| Nozzle temp | ° C. | 320 |
| Mold temp | ° C. | 160 |
| Screw speed | rpm | 100 |
| Back pressure | $kgf/cm^2$ | 30 |
| Cooling time | s | 20-30 |
| Injection speed | mm/s | 100-200 |
| Holding pressure | $kgf/cm^2$ | 600-1000 |
| Max. Injection pressure | $kgf/cm^2$ | 1000-2500 |

PPS LDS formulations were prepared as presented in Table 5.

TABLE 5

| Formulations of PPS LDS compositions | | | | | | | | |
|---|---|---|---|---|---|---|---|---|
| | | | Group 1 | | | Group 2 | | |
| Item | | Unit | E1 | E2 | E3 | E4 | E5 | E6 |
| PPS-1 | | % | — | — | 53.6 | — | — | 53.6 |
| PPS-2 | | % | — | 53.6 | — | — | 53.6 | — |
| PPS-3 | | % | 53.6 | — | — | 53.6 | — | — |
| GF | | % | 40 | 40 | 40 | 40 | 40 | 40 |
| LDS1 | | % | — | — | — | 5 | 5 | 5 |
| LDS2 | | % | 5 | 5 | 5 | — | — | — |
| PEEK | | % | 0.2 | 0.2 | 0.2 | 0.2 | 0.2 | 0.2 |
| Silane | | % | 0.5 | 0.5 | 0.5 | 0.5 | 0.5 | 0.5 |
| AOX1 | | % | 0.2 | 0.2 | 0.2 | 0.2 | 0.2 | 0.2 |
| AOX2 | | % | 0.2 | 0.2 | 0.2 | 0.2 | 0.2 | 0.2 |
| MR | | % | 0.3 | 0.3 | 0.3 | 0.3 | 0.3 | 0.3 |
| Test | Testing Method | Unit | E1 | E2 | E3 | E4 | ES | E6 |
| Density | ISO-1183 | g/cc | 1.73 | 1.79 | 1.73 | 1.736 | 1.73 | 1.73 |
| Notched IZOD | ISO-180 | $kj/m^2$ | 4.74 | 4.33 | 4.7 | 5.3 | 4.7 | 4.6 |
| Un-notched Izod | ISO-180 | $kj/m^2$ | 25.3 | 25 | 25.6 | 27.5 | 23.5 | 23 |

TABLE 5-continued

| Formulations of PPS LDS compositions | | | | | | | | |
|---|---|---|---|---|---|---|---|---|
| HDT (0.45 MPa) | ISO-75 | ° C. | >280 | >280 | >280 | >280 | >280 | >280 |
| HDT (1.82 MPa) | ISO-75 | ° C. | 260 | 260 | 265 | 260 | 257 | 265 |
| Flexural Modulus | ISO-178 | MPa | 1410 | 1450 | 1440 | 14430 | 1382 | 14500 |
| Flexural Strength | ISO-178 | MPa | 202 | 195 | 204 | 216 | 189 | 193 |
| Tensile Modulus | ISO-527 | MPa | 1470 | 1510 | 1547 | 15550 | 1442 | 14990 |
| Tensile Strength | ISO-527 | MPa | 142 | 139 | 151 | 156 | 137 | 143 |
| Tensile Elongation at break | ISO-527 | % | 1.5 | 1.4 | 1.5 | 1.6 | 1.5 | 1.4 |
| Dk | 1.9 Ghz, SPDR method | | 4.24 | 4.37 | 4.24 | 4.2 | 4.17 | 4.2 |
| Df | 1.9 Ghz, SPDR method | | 0.00 | 0.00 | 0.00 | 0.004 | 0.013 | 0.013 |
| Plating Index | LPKF Method | Avera | 0.29 | 0.12 | 0.17 | 0.41 | 0.29 | 0.34 |
| | | Best | 0.84 | 0.62 | 0.64 | 0.56 | 0.44 | 0.45 |

Dielectric constant (DK) and dissipation factor (DF) at fixed frequencies were tested on molded samples using a split post dielectric resonator (SPDR) and network analyzer.

Plating index is defined as a ratio between an average copper thickness obtained under a specific laser parameter of a tested sample and that of a reference sample. The reference sample was a polybutylene terephthalate (PBT) based LDS specimen commercially available as Pocan™ DP 7102. Desirably, the plating index of a LDS resin needs to be higher than 0.7.

Table 5 presents the formulations and test results of two groups of PPS LDS compositions. Group 1 (E1 to E3) and Group 2 (E4-E6) include different LDS additives. In each group, three PPS grades are employed as base resin. As listed in Table 1, the three PPS grades are mainly different from Molecular weight and end-capper. The polyphenylene sulfides PPS-3 and PPS-2 have the same end-capping groups, but differ according to $M_w$ and Mn. The grade PPS-1 and PPS-2 have a similar $M_w$ and $M_n$ but differ according to the endcapping group. Thus, one can compare the LDS additive effectiveness for PPS between the Group 1 and Group 2. Meanwhile, one can also compare the influence of the PPS resin on LDS performance within each group.

Samples of both groups exhibit laser plating performance as evidenced by the observed plating index PI. PI is a comparative value that indicates the rate of plating of a specific material compared to the rate of plating for a specific reference material. The Group 2 samples exhibited a higher average PI than Group 1. However, regarding the highest PI that was achieved, Group 1 performed better than Group 2. From a practical standpoint, the highest PI is more critical for mass production, because it creates a window to achieve the highest production efficiency. The mechanical and heat performance observed between Group 1 and Group 2 were also quite close. Group 1 samples also exhibited much lower Df values than Group 2. As such, antimony doped tin oxide appeared to be the more desirable than copper chromite as LDS additive for PPS based LDS compositions examined herein.

PPS with a higher melt viscosity (characterized by a high $M_w$ and high Mn from synthesize viewpoint) exhibited better LDS activity than low viscosity PPS. In both groups, the PPS-3 achieved a 50% higher PI over PPS-2 and PPS-1. Therefore, PPS base resin with viscosity similar or higher than PPS-3 was more desirable for a PPS-based LDS composition. The low LDS activity of PPS resins has been an unsolved issue for quite a long time, that is why there is no mature PPS base LDS compounds in the market. Someone has tried to solve the activity issue by doping high loading of LDS additive, however, this approach will drop mechanical performance dramatically and be very costly, which has very little commercial value. From our study, it appears that using high molecular weight PPS resin is a promising way to address the LDS activity issue. PPS is kind of polymer that has sulfur on both mainchain and end-capper, while LDS process usually need copper as seeds to start plating process. However, copper and sulfur are very easy to form Copper Sulfide which is a high stable compound and thus dropping the activity of LDS additive. The sulfur exist on the mainchain has no reactivity with copper while the end-capper with derived from synthesizing and decomposition during processing will have reaction with copper.

Given these results, it appeared that the higher $M_w$ PPS with a relatively lower amount of end-capping groups, thereby improving the LDS activity of the PPS-based LDS compositions. Conversely, a comparison of the PI between PPS-2 and PPS-1 (having different end-capping groups), PPS-1 exhibited slightly better LDS performance than PPS-2 in both LDS groups 1 and 2. PPS-2 includes an —SH as end-capper PPS-1 featured —SNa as end-capper. Accordingly, it could not be established that —SH and —SNa end-capping groups result in different LDS plating performance. Rather, it appeared that they performed similarly. Given the results of groups 1 and 2, it was found that LDS activity of PPS-based resins could be improved by including a high molecular weight PPS and a suitable LDS additive.

Still, the values for plating index presented in Table 5 was not as robust as prevailing industry standards which demand a plating index of at least 0.7. Further investigations were performed to optimize the LDS plating performance. Formulations E7 through E10 prepared from PPS-3 and including PPO were prepared. These samples also incorporated different LDS additives to determine which performed best.

TABLE 6

Formulations of PPS-LDS Compositions having PPS-3 (High MW)

| Item Description | | Unit | E7 | E8 | E9 | E10 |
|---|---|---|---|---|---|---|
| PPS-3 | | % | 54.6 | 56.6 | 51.6 | 51.1 |
| PPO | | % | | | 5 | 5 |
| GF | | % | 38 | 38 | 36 | 36 |
| LDS1 | | % | | | | 0.5 |
| LDS2 | | % | 6 | 8 | 6 | 6 |
| PEEK | | % | 0.2 | 0.2 | 0.2 | 0.2 |
| Silane | | % | 0.5 | 0.5 | 0.5 | 0.5 |
| AOX1 | | % | 0.2 | 0.2 | 0.2 | 0.2 |
| AOX2 | | % | 0.2 | 0.2 | 0.2 | 0.2 |
| MR | | % | 0.3 | 0.3 | 0.3 | 0.3 |
| **Test Item** | **Testing Method** | **Unit** | **E7** | **E8** | **E9** | **E10** |
| Density | ISO-1183 | g/cc | 1.73 | 1.768 | 1.683 | 1.692 |
| Notched IZOD | ISO-180 | kj/$m^2$ | 5 | 4.8 | 4.4 | 4.3 |
| Unnotched Izod | ISO-180 | kj/$m^2$ | 29 | 26 | 26 | 25 |
| HDT (0.45 MPa) | ISO-75 | ° C. | 276 | 276 | 276 | 275 |
| HDT (1.82 MPa) | ISO-75 | ° C. | 255 | 255 | 250 | 251 |
| Flexural Modulus | ISO-178 | MPa | 12564 | 12858 | 11771 | 11789 |
| Flexural Strength | ISO-178 | MPa | 199 | 201 | 185 | 177 |
| Tensile Modulus | ISO-527 | MPa | 13783 | 13979 | 12886 | 12953 |
| Tensile Strength | ISO-527 | MPa | 137 | 136 | 122 | 125 |
| Tensile Elongation at break | ISO-527 | % | 1.55 | 1.53 | 1.4 | 1.4 |
| Dk | 1.9 Ghz, SPDR | | 4.2 | 4.3 | 4.08 | 4.1 |
| Df | 1.9 Ghz, SPDR | | 0.0044 | 0.0044 | 0.0044 | 0.0052 |
| Plating Index | LPKF Method | Avg. | 0.45 | 0.60 | 0.57 | 0.72 |
| | | Best | 0.9 | 1.0 | 0.9 | 1.0 |
| Plating Layer Adhesion | Cross-hatch, ISO method | | 5B | 5B | 5B | 5B |

Table 6 includes formulation of improved PPS LDS compositions and their results. Samples E7 and E8 included high Mw PPS (PPS-3) and ATO (Antimony doped Tin Oxide) as these formulations performed best among groups 1 and 2 in Table 5. Here, the concentration of ATO in PPS was increased to further improve the LDS activity (increase the plating index). The concentration of ATO in PPS can be easily defined as the weight ratio between ATO and ATO plus PPS. In E1 of Table 5, the ATO concentration was 5/(5+53.6)=8.5%, and for E7 and E8, the concentration was 9.9% and 12.3%. If comparing the average PI and best PI of E1, E7 and E8, it appears that with higher loading of ATO, the plating performance can be effectively increased. However, the ATO is a relatively high cost raw material and contributed to an increase in composition density, which is generally undesirable from a production perspective.

To resolve this, PPO was introduced into the formulation. PPO has much higher LDS activity than PPS and it also has certain compatibility with PPS, so it can be used to replace a portion of PPS volume and achieve higher overall plating performance under same ATO loading. PPO has a much lower density than PPS, and thus contributed to the density control for final compounds. A comparison of samples E7 and E9 demonstrated the advantages of incorporating PPO. The average plating index increased from 0.45 to 0.57 with same ATO loading. Secondly, the density dropped from 1.73 to 1.68.

Furthermore, adding 0.5% Copper chromite oxide to E9 as shown in E10, further increased the plating index to 0.72. This indicated that using hybrid or mixed LDS additive system may synergistically improve the plating index. By reading the detailed plating data, we found that copper chromite oxide has helped the plating of very high energy and low energy laser window, thus improving the overall plating performance. All the plating adhesion of Examples listed in Table 6 were 5B which suggested a very strong bonding force between the plated metal layer and material.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the disclosure should be determined with reference to the appended claims, along with the full scope of equivalents to which such claims are entitled.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

What is claimed is:

1. A thermoplastic composition comprising:

a. from about 30 wt. % to about 70 wt. % of a polyphenylene sulfide, wherein the polyphenylene sulfide has a melt volume rate of less than 50 cc/10 minutes when tested in accordance with ISO-1133 at a temperature of 300 °C with a 2.16 kg load;

b. from about 1 wt. % to about 10 wt. % of a resin comprising polyphenylene oxide;

c. from about 5 wt. % to about 15 wt. % of a laser activable metal compound, wherein the laser activable metal compound consists of antimony-doped tin oxide; and d. from about 10 wt. % to about 70 wt. % of an inorganic filler comprising glass fiber, wherein the composition exhibits a wherein the composition exhibits a plating index of at least 0.7 wherein plating index is measured in accordance with an LPKF Method, and wherein the combined weight percent value of all components does not exceed 100 wt. %, and all weight percent values are based on the total weight of the composition.

2. The thermoplastic composition according to claim 1, wherein the polyphenylene sulfide has a number-average molecular weight Mn greater than 9000 Daltons as determined according to a GPC method.

3. The thermoplastic composition according to claim 1, wherein the polyphenylene sulfide is a linear polyphenylene sulfide.

4. The thermoplastic composition according to claim 1, wherein the resin comprising polyphenylene oxide is polyphenylene oxide or a polyphenylene oxide copolymer.

5. The thermoplastic composition according to claim 1, wherein the resin comprising polyphenylene oxide is polyphenylene oxide or a polyphenylene oxide siloxane copolymer.

6. The thermoplastic composition according to claim 1, wherein the laser activable metal compound comprises antimony-doped tin oxide and one or more of copper chromite oxide or copper hydroxide phosphate.

7. The thermoplastic composition according to claim 1, wherein a weight ratio between the antimony-doped tin oxide and the antimony-doped tin oxide plus the polyphenylene sulfide is equal to or greater than 8.5%.

8. The thermoplastic composition according to claim 1, wherein a weight ratio between the antimony-doped tin oxide and the antimony-doped tin oxide plus the polyphenylene sulfide is equal to or higher than 9.9%.

9. The thermoplastic composition according to claim 1, wherein the thermoplastic composition further comprises at least one additional additive, wherein the at least one additional additive comprises a filler, acid scavenger, anti-drip agent, antioxidant, antistatic agent, chain extender, colorant, de-molding agent, flow promoter, lubricant, mold release agent, plasticizer, quenching agent, flame retardant, UV reflecting additive, or a combination thereof.

10. An article formed from the thermoplastic composition according to claim 1.

11. The article according to claim 10, wherein the article is a component of an electronic device.

12. A thermoplastic composition comprising:

a. from about 30 wt. % to about 70 wt. % of a polyphenylene sulfide, wherein the polyphenylene sulfide has a melt volume rate of less than 50 cc/10 minutes when tested in accordance with ISO-1133 at a temperature of 300 °C with a 2.16 kg load;

b. from about 1 wt. % to about 10 wt. % of a resin comprising polyphenylene oxide;

c. from about 5 wt. % to about 15 wt. % of a laser activable metal compound, wherein the laser activable metal compound is antimony-doped tin oxide, wherein a weight ratio between the antimony-doped tin oxide and the antimony-doped tin oxide plus the polyphenylene sulfide is equal to or greater than 8.5%; and d. from about 10 wt. % to about 70 wt. % of an inorganic filler comprising glass fiber, wherein the composition exhibits a plating index of at least 0.7 wherein plating index is measured in accordance with an LPKF Method, and wherein the combined weight percent value of all components does not exceed 100 wt. %, and all weight percent values are based on the total weight of the composition.

13. The thermoplastic composition according to claim 1, wherein the composition comprises from about 3 wt. % to about 6 wt. % of the polyphenylene oxide.

14. The thermoplastic composition according to claim 12, wherein the composition comprises from about 3 wt. % to about 6 wt. % of the polyphenylene oxide.

15. The thermoplastic composition according to claim 1, wherein the composition comprises about 5 wt. % of the polyphenylene oxide.

16. The thermoplastic composition according to claim 12, wherein the composition comprises about 5 wt. % of the polyphenylene oxide.

* * * * *